(12) United States Patent
Fu et al.

(10) Patent No.: US 10,160,670 B2
(45) Date of Patent: Dec. 25, 2018

(54) METHODS AND SYSTEMS FOR POLARIZATION CONTROL

(71) Applicant: EVOQUA WATER TECHNOLOGIES PTE. LTD, Singapore (SG)

(72) Inventors: Ronqiang Fu, Singapore (SG); Kee Hoe Ng, Singapore (SG); Li-Shiang Liang, Harvard, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 186 days.

(21) Appl. No.: 14/898,954

(22) PCT Filed: Jun. 25, 2014

(86) PCT No.: PCT/US2014/044153
§ 371 (c)(1),
(2) Date: Dec. 16, 2015

(87) PCT Pub. No.: WO2014/210198
PCT Pub. Date: Dec. 31, 2014

(65) Prior Publication Data
US 2016/0368791 A1    Dec. 22, 2016

Related U.S. Application Data

(60) Provisional application No. 61/839,495, filed on Jun. 26, 2013.

(51) Int. Cl.
C02F 1/46     (2006.01)
C02F 1/469    (2006.01)
C02F 9/02     (2006.01)
C02F 1/00     (2006.01)
C02F 9/00     (2006.01)
C02F 1/461    (2006.01)
C02F 103/08   (2006.01)

(52) U.S. Cl.
CPC .......... C02F 1/4695 (2013.01); C02F 1/008 (2013.01); C02F 1/4604 (2013.01); C02F 1/4693 (2013.01); C02F 9/00 (2013.01); C02F 1/46104 (2013.01); C02F 2103/08 (2013.01); C02F 2201/4614 (2013.01); C02F 2201/46135 (2013.01); C02F 2201/46145 (2013.01); C02F 2209/10 (2013.01); C02F 2301/08 (2013.01); Y02W 10/33 (2015.05); Y02W 10/37 (2015.05)

(58) Field of Classification Search
CPC .......... C02F 9/00; C02F 9/005; C02F 1/4604; C02F 1/46104; C02F 1/4691–1/4695
See application file for complete search history.

(56) References Cited

U.S. PATENT DOCUMENTS 8,038,867 B2 * 10/2011 Du .................... B01D 61/44
                                              205/743
2006/0157422 A1   7/2006 Freydina et al.
2011/0180477 A1   7/2011 Ganzi et al.
2011/0209530 A1   9/2011 Coulter

FOREIGN PATENT DOCUMENTS

WO    2009082573 A1    7/2009
WO    2013006438 A1    1/2013

* cited by examiner

*Primary Examiner* — Brian W Cohen

(57) ABSTRACT

Disclosed are methods to predict the occurrence of polarization and the design and operation of electrochemical systems to maintain a current density below the limiting current density and avoid instability.

7 Claims, 16 Drawing Sheets

METHODS AND SYSTEMS FOR POLARIZATION CONTROL

FIELD OF TECHNOLOGY

One or more aspects of the disclosure relate generally to water treatment, and more particularly to systems and methods for treating water in an electrochemical system to control concentration polarization.

SUMMARY

One or more aspects of the disclosure provide for a method of operating a multi-stage electrochemical treatment system. The multi-stage electrochemical treatment system may have a first stage with at least one electrochemical treatment device comprising a first cell stack, and a second stage with at least one electrochemical treatment device comprising a second cell stack, the first stage in fluid communication upstream of the second stage. The method may comprise introducing a liquid to be treated to an inlet of the first stage. The method may comprise calculating a limiting current density for the first stage. The method may comprise operating in the first stage at a first current density across the first cell stack, the first current density below the limiting current density for the first stage. The method may comprise removing a first amount of total dissolved solids from the liquid, in the first stage, to produce a partially-treated liquid. The method may comprise withdrawing the partially-treated liquid from an outlet of the first stage. The method may comprise introducing the partially-treated liquid to an inlet of the second stage. The method may comprise calculating a limiting current density for the second stage. The method may comprise operating in the second stage at a second current density across the second cell stack, the second current density below the limiting current density for the second stage. The method may comprise removing a second amount of total dissolved solids from the partially-treated liquid, in the second stage, the second amount of total dissolved solids being less than the first amount of total dissolved solids to produce a treated liquid. The method may comprise providing the treated liquid at an outlet of the second stage.

The method may further comprise operating at a first liquid flow velocity through the first stage and operating in the second stage comprises operating at a second liquid flow velocity through the second stage, the second liquid flow velocity being greater than the first liquid flow velocity. The method may further comprise measuring a total dissolved solids concentration and a flow rate of the liquid to be treated at the inlet to the first stage. The method may further comprise calculating the limiting current density for the first stage based in part on the the total dissolved solids concentration of the liquid to be treated and the flow rate of the liquid to be treated. The method may further comprise calculating the limiting current density for the second stage based in part on a measured total dissolved solids concentration of the partially-treated liquid and a measured flow rate of the partially-treated liquid. A total dissolved solids concentration of the liquid to be treated at the inlet of the first stage may be greater than about 30,000 ppm. A total dissolved solids concentration of the treated liquid may be less than about 500 ppm.

One or more aspects of the disclosure provide for a multi-stage electrochemical treatment system for treating a liquid. The system may comprise a first stage comprising an electrochemical treatment device having a first limiting current density. The system may comprise a second stage comprising an electrochemical treatment device having a second limiting current density, the second stage in fluid communication downstream of the first stage. The system may comprise a control system configured to provide a first current density between a first set of electrodes in the first stage that is below the first limiting current density and to provide a second current density between a second set of electrodes in the second stage that is below the second limiting current density, the second current density being different from the first current density.

The first stage of the system may further comprise a first flow velocity sensor and a first total dissolved solids concentration sensor. The second stage of the system may further comprise a second flow velocity sensor and a second total dissolved solids concentration sensor. The control system may be further configured to calculate the first limiting current density based in part on a first input signal from the first flow velocity sensor and a second input signal from the first total dissolved solids concentration sensor. The control system may be further configured to calculate the second limiting current density based in part on a first input signal from the second flow velocity sensor and a second input signal from the second total dissolved solids concentration sensor. The electrochemical treatment device of the first stage may comprise a first total number of cell pairs, and the electrochemical treatment device of the second stage may comprise a second total number of cell pairs, the second total number of cell pairs being less than the first total number of cell pairs. The electrochemical treatment device of either the first stage or the second stage may further comprise a blocking spacer configured to promote multiple flow passes of the liquid through the electrochemical treatment device of the second stage. The blocking spacer may be positioned between a first flow-pass sub-unit and a second flow-pass sub-unit.

The first flow-pass sub-unit of the system may comprise a first total number of cell pairs, and the second flow-pass sub-unit may comprise a second total number of cell pairs, the second total number of cell pairs being less than the first total number of cell pairs. The controller may be configured to provide for removal of a first amount of total dissolved solids from the liquid in the first stage and a second amount of total dissolved solids from the liquid in the second stage, the first amount of total dissolved solids being greater than the second amount of total dissolved solids. The electrochemical treatment device of the first stage may comprise one of an electrodialysis device and an electrodeionization device. The electrochemical treatment device of the second stage may comprise one of an electrodialysis device and an electrodeionization device. The system may further comprise a third stage having a third limiting current density, the third stage comprising at least one modular electrochemical treatment device, the third stage in fluid communication downstream of the first stage and in fluid communication upstream of the second stage.

One or more aspects of the disclosure provide for a multi-stage electrochemical treatment system for treating a liquid. The system may comprise a first electrochemical treatment train. The first electrochemical treatment train may comprise a first stage comprising an electrochemical treatment device having a first limiting current density. The first electrochemical treatment train may comprise a second stage comprising an electrochemical treatment device having a second limiting current density different from the first limiting current density, the second stage in fluid communication downstream of the first stage. The system may comprise a second electrochemical treatment train in fluid communication with the first electrochemical treatment train. The second electrochemical treatment train may comprise a third stage comprising an electrochemical treatment device having a third limiting current density. The second electrochemical treatment train may comprise a fourth stage, the fourth stage comprising at least one electrochemical treatment device having a fourth limiting current density different from the third limiting current density, the fourth stage in fluid communication downstream of the third stage. The system may comprise a control system configured to provide a first current density between a first set of electrodes in the first stage that is below the first limiting current density, a second current density, different from the first current density, between a second set of electrodes in the second stage that is below the second limiting current density, a third current density between a third set of electrodes in the third stage that is below the third limiting current density, and a fourth current density, different from the third current density, between a fourth set of electrodes in the fourth stage that is below the fourth limiting current density.

The system may further comprise a polisher device fluidly connected downstream of the first electrochemical treatment train and the second electrochemical treatment train. The polisher device may be one of an electrodialysis device and an electrodeionization device. The first electrochemical treatment train may be arranged in parallel with the second electrochemical treatment train.

DESCRIPTION OF THE DRAWINGS

The accompanying drawings are not intended to be drawn to scale. For purposes of clarity, not every component may be labeled in the drawings, nor is every component of each embodiment of the disclosure shown where illustration is not necessary to allow those of ordinary skill in the art to understand the disclosure.

DETAILED DESCRIPTION

Figure 1:
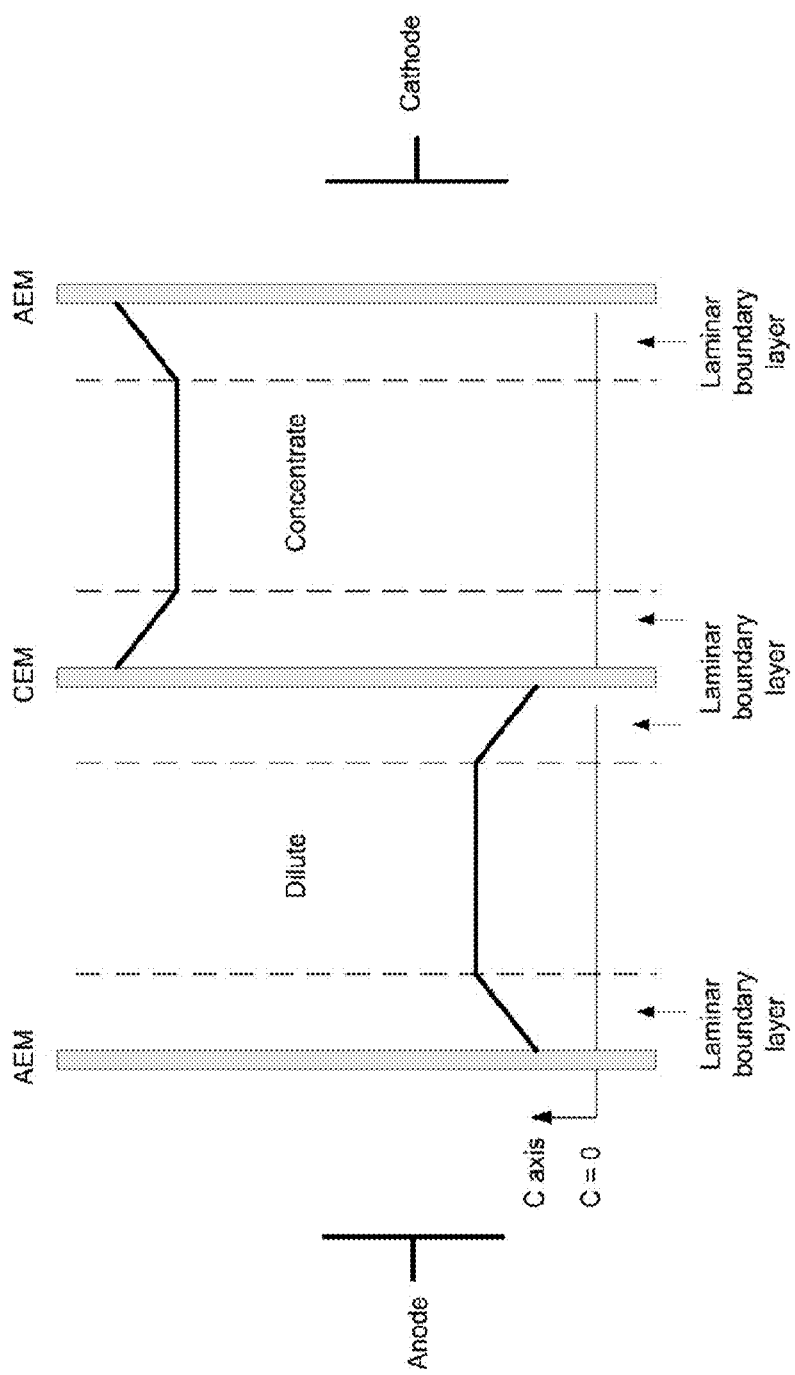
FIG. 1 presents a concentration profile in a cell pair of an electrodialysis (ED) system.

Electrochemical systems for purifying fluids with electrical fields may be used to treat water and other liquids containing dissolved ionic species. Two types of electrochemical treatment devices that treat water in this way are electrodeionization and electrodialysis devices.

Electrodeionization (EDI) is a process that removes, or at least reduces the concentration of, one or more ionized or ionizable species from water using electrically active media and an electric potential to influence ion transport. The electrically active media is typically regenerated by ions derived from the electrolysis (splitting) of water molecules within an EDI device. Continuous electrodeionization (CEDI) devices are EDI devices that operate in a manner in which water purification may proceed continuously, while ion exchange material is continuously regenerated.

Electrodialysis (ED) devices operate on a similar principle as CEDI, except that ED devices typically do not contain electroactive media between the membranes. In ED-based systems, because there is no electroactive media, splitting of water molecules unnecessarily consumes energy, reducing the efficiency of operation of the system. Operating an ED-based system in a regime in which the splitting of water molecules occurs is desirably avoided.

Electrochemical treatment devices typically include cell stack made up of alternating electroactive semi-permeable anion and cation exchange membranes. Spaces between the membranes define liquid flow compartments with inlets and outlets. An applied electric field imposed via electrodes causes dissolved cations, attracted to a cathode of an electrochemical device, to migrate through cation exchange membranes of the electrochemical device while dissolved anions, attracted to an anode of the electrochemical device, migrate through anion exchange membranes of the electrochemical device. As water flows through the depletion compartments, ionic and other charged species are typically drawn into concentrating compartments under the influence of an electric field, for example, a direct current (DC) field. Positively charged species are drawn toward a cathode, typically located at one end of a stack of multiple depletion and concentration compartments, and negatively charged species are likewise drawn toward an anode of such devices, typically located at the opposite end of the stack of compartments.

Migration of ions through the membranes of an electrochemical device under the influence of an applied electric field results in the liquid of the diluting compartment being depleted of ions, and the liquid in the concentrating compartment being enriched with the transferred ions, as discussed in patent application number PCT/US2012/044937 titled "Electrodesalination System and Method" filed Jun. 29, 2012 which is hereby incorporated by reference in its entirety for all purposes. In electrochemical devices, the DC field is typically applied to the cells from a source of voltage and electric current applied to a set of electrodes comprising an anode (or positive electrode), and cathode (or negative electrode). The voltage and current source (collectively "power supply") may be itself powered by a variety of means such as an AC power source, or, for example, a power source derived from solar, wind, or wave power.

The maximum current achievable in an electrochemical system before water splitting occurs is called the limiting current. Current limiting occurs in electrodialysis systems when the rate of ion transfer from the bulk dilute solution to the membrane surfaces is lower than the rate of transfer of ions through the membranes. The concentrations of ions at the membrane surfaces approach zero. The result is rapid increase in the voltage required to drive the current, water splitting at the membrane surfaces, and unstable operation. Empirical equations have been developed for the limiting current as a function of bulk concentration and flow velocity. It is often desirable to avoid exceeding the limiting current during operation of an electrochemical system.

During electrochemical operation the concentrations of ions in the solutions next to the membrane surfaces are different from the concentrations in the bulk of the flow compartments. This phenomenon is called concentration polarization Strathmann, H. 2004. *Ion exchange membrane separation processes; Membrane Science and Technology Series, 9. Elsevier.* In the extreme case of polarization, the ionic concentration in the dilute approaches zero at the membrane surfaces and current limiting occurs. Experience with laboratory and pilot operations indicate that stability can be restored only with difficulty once the limiting current is reached. Remedial action may require, for example, turning off the power and allowing the feed water to flow un-deionized through the dilute compartments or flushing the module with high salinity water.

In a commercial desalination plant, taking modules offline to restore stability is undesirable. Prevention of current limiting is therefore often a priority in design and operation of electrochemical systems, along with energy consumption and capital cost.

FIG. 1 shows idealized concentration profiles of ions in a solution in cells of an electrochemical device to illustrate concentration polarization. For simplicity, the solution is assumed to contain only NaCl. The concentration of an ion is assumed to be uniform in the bulk of the diluting and concentrating streams. Within boundary layers adjacent to the membranes, the flow of solution through the cells is laminar and parallel to the membrane surfaces so there is no convective mixing. The thickness of the boundary layer depends on the velocity in the bulk solution.

Figure 2:
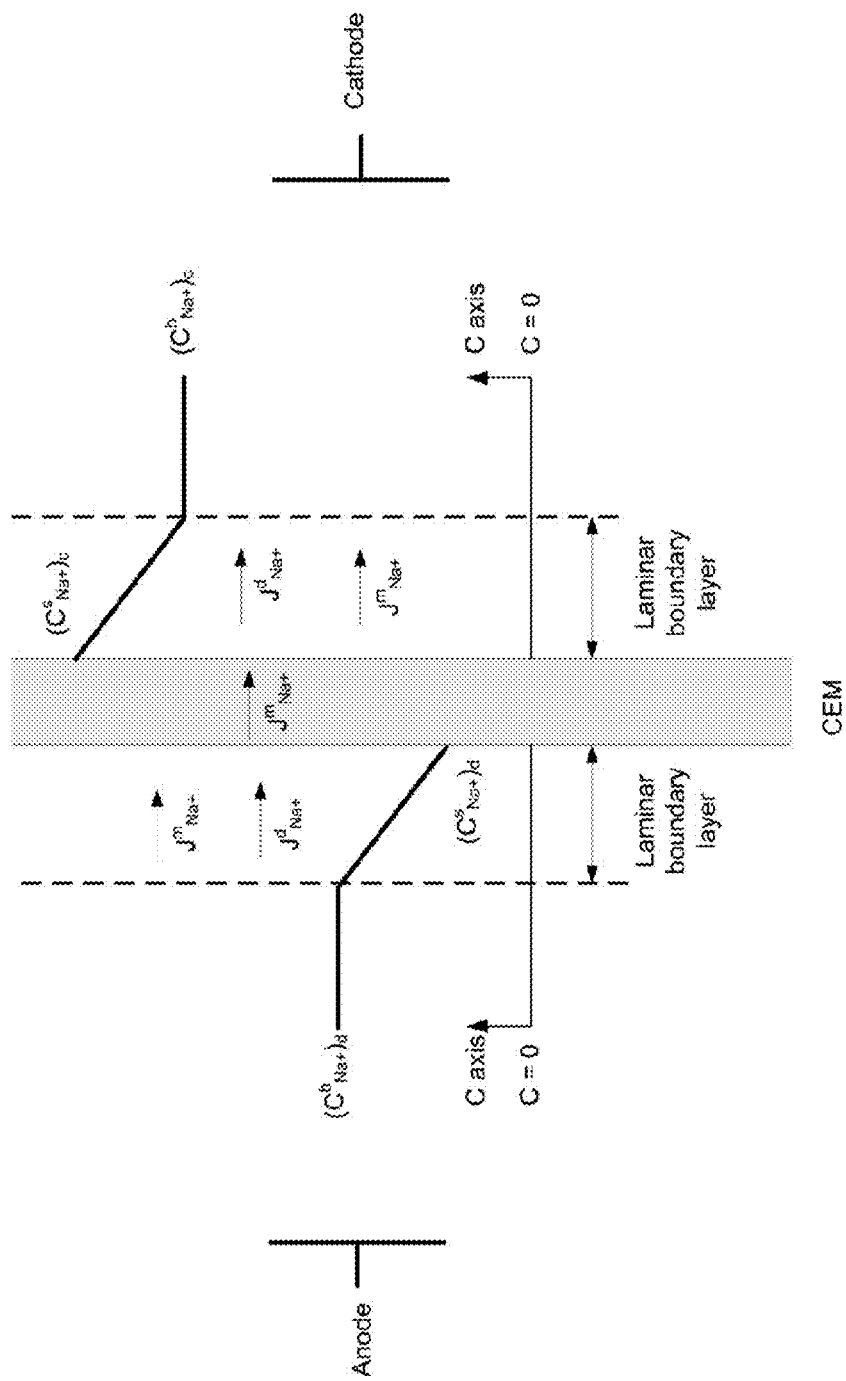
FIG. 2 presents a concentration profile of $Na^+$ ions next to a cation exchange membrane of an electrochemical system.

FIG. 2 shows the profile of $Na^+$ concentration next to the cation exchange membrane (CEM). Assuming that the membrane is perfectly selective, only the $Na^+$ ions are transferred through the cation exchange membrane (CEM) due to the DC electric field. In the boundary layer, the $Na^+$ ions are transferred from the bulk solution to the membrane surface by "migration" due to the electric field and by diffusion due to the concentration gradient. The rates of transfer of $Na^+$ through the membrane and the adjacent boundary layer are the same. Due to electroneutrality, the concentration of the $Cl^-$ ions has the same profile as the $Na^+$ ions.

Similarly, the $Cl^-$ concentration decreases in the boundary layer adjacent to the anion exchange membrane (AEM) and again due to electroneutrality, the concentration profile of the $Na^+$ ions is the same as that of the $Cl^-$ ions. The concentration profiles of the $Na^+$ and the $Cl^-$ ions are therefore assumed to be the same and therefore represented by a profile for NaCl as in FIG. 1.

Figure 3:
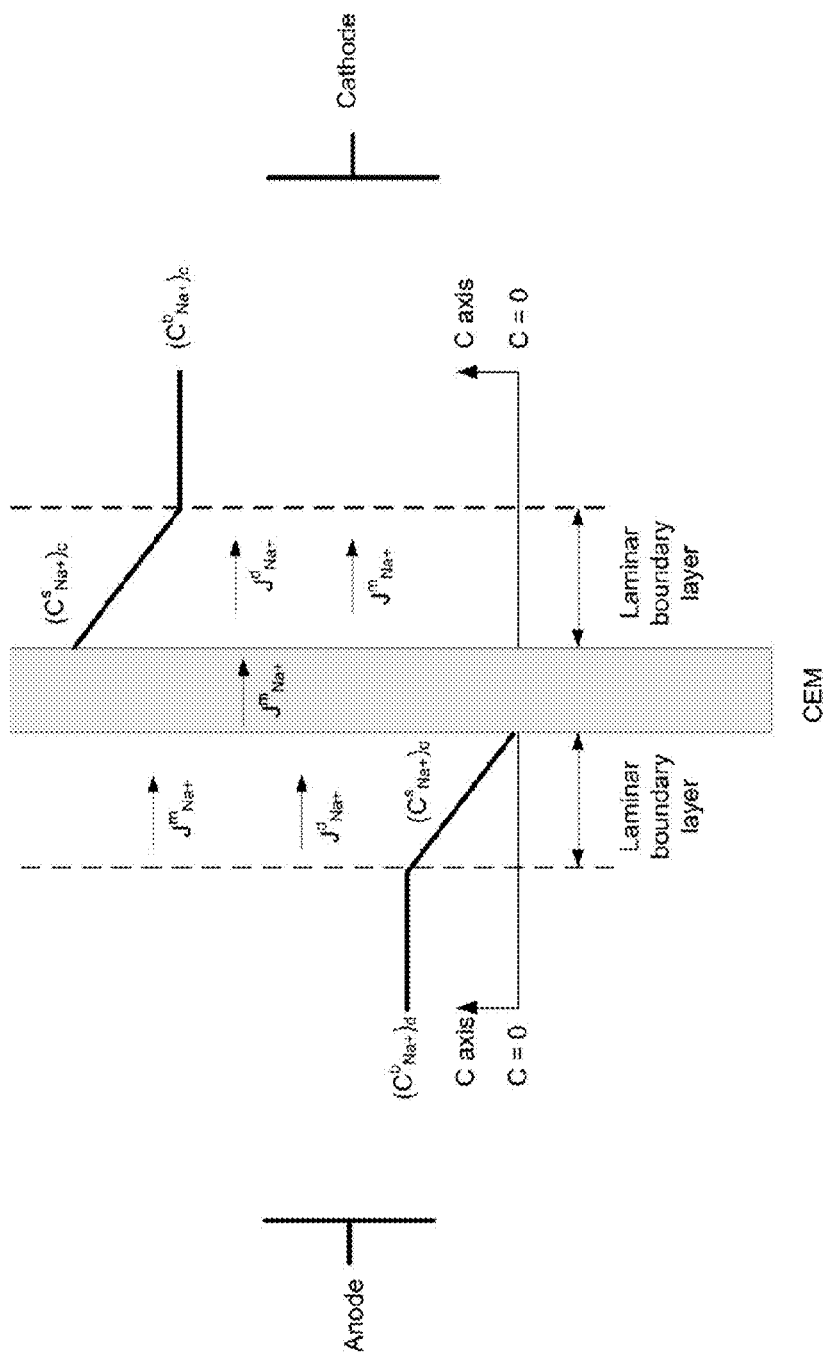
FIG. 3 presents a concentration profile of $Na^+$ ions where polarization is imminent.

FIG. 3 shows the concentration profiles as the diluting stream is further desalted and current limiting is imminent. The ionic concentration in the bulk of the diluting stream has decreased to the point that the corresponding concentration at the membrane surfaces approaches zero. The diluting stream conductivity, which is approximately linearly dependent on the concentration, also decreases to zero. The electrical potential necessary to drive the current through the diluting stream-membrane interface therefore increases sharply. Further current transfer is possible only if water splitting occurs to furnish $H^+$ and $OH^-$ ions to provide conductivity.

Concentration polarization in an actual electrochemical operation is typically more complex than illustrated in FIGS. 1-3. For example, netting in the flow compartments, which may be utilized to keep the membranes apart, may promote fluid mixing. Depending on the netting geometry and Reynolds number, the netting may also create stagnant zones downstream of the strands of the netting (referred to as the "shadow effect"). The simple boundary layer as shown in FIG. 1 may therefore not be entirely accurate for actual electrochemical devices. Also, ion exchange membranes are not perfectly selective, and water is also transported through the membranes due to electro-osmosis and osmosis. Both phenomena affect the ionic profiles in the solution immediately adjacent to the membrane surfaces.

A mathematically rigorous analysis of polarization and current limiting may require a finite element approach incorporating fluid mechanics, mass transfer, electrochemistry and chemical equilibrium. A super computer may be required.

Researchers therefore have relied on empirical equations for limiting current when modeling polarization, for example:

$$i_{lim} = a\, C\, u^b \tag{1}$$

Where:
$i_{lim}$=limiting current density
C=bulk concentration
u=bulk velocity
a, b=constants determined from experimental data Equation 1 may be replaced with more complex algorithms for calculating limiting current density as needed. The algorithms may take into account membrane properties, netting design, inter-membrane spacing, or other properties in the particular electrochemical device of interest.

To avoid polarization, the applied current density must be lower than the limiting current density at any point in the diluting stream. The equation shows that $i_{lim}$ decreases to a minimum value as the bulk concentration approaches zero. Therefore it is expected that the risk of polarization to be highest at the outlet of the diluting stream.

Since the limiting current density is increased by increasing the bulk velocity and bulk concentration of the fluid being treated, proper control of these variables may aid in creating a system in which the limiting current density is not exceeded.

Current density may be understood as the current divided by the area through which that current is passing. In the context of an electrochemical treatment system the area through which the current is passing may be the surface of a membrane in contact with the liquid being treated.

Disclosed herein are multi-stage electrochemical treatment systems and methods for operating those systems in an efficient manner while avoiding operating at currents that produce an applied current density exceeding the limiting current density. The disclosed methods may further aid in predicting the occurrence of polarization and the design and operation of electrochemical systems to maintain the current below the limiting current density and avoid instability. The disclosed systems and methods may reduce the number of electrochemical devices required (and therefore the capital cost) for a given product flow rate.

A number of factors may be considered in developing and operating an electrochemical treatment system that efficiently avoids the limiting current density. In creating and operating an electrochemical system that treats water without exceeding the limiting current density, it may be desired that energy consumption and capital costs be minimized Likewise, it may be desired that water recovery and product flow rate be maximized System design and operation may involve some trade-offs. For example, increasing product flow rate in some systems may also require an increase in energy consumption. The operation of the system may also account for input variables such as feed water composition and temperature.

The control variables available to the operators of an electrochemical desalination system include applied current, applied voltage, temperature of the stream, ionic or TDS concentration of the stream, flow rate, and flow velocity. For example, to prevent polarization in electrochemical operations for desalinating seawater, velocity of liquid in the dilute compartment may be increased in the later stages of the desalting process in accordance with one or more embodiments. Avoiding the limiting current density may result in lower module resistance, (i.e. lower energy consumption), lower risk of scaling (i.e. reduced generation of $OH^-$ ions), and improved current efficiency (i.e. reduced module resistance and reduced risk of electrical shorting or leakage).

Power consumption may be affected by the type of electrochemical device chosen at a particular stage of treatment and for a particular feed profile. For example, the ion exchange resin contained in an EDI module helps to reduce the applied voltage when the water is low in conductivity. If an EDI module is used on seawater, the impact of the ion exchange resin in the dilute compartment is small. Conversely, if the water in an ED module is too pure, a high electrical resistance will result which contributes to excess power consumption.

The disclosed treatment systems and methods may be used for a variety of purposes. For example, an influent, or liquid to be treated, by the electrochemical device may comprise a salt solution. A salt solution may contain a single salt species or a mixture of salt species, for example, as may be present in seawater. In at least one embodiment, the resulting treated liquid may comprise potable water. Potable water typically has a total dissolved solids (TDS) content of less than about 1,500 ppm. In some embodiments, processed potable water may have a TDS of less than about 1,000 ppm. In some embodiments, processed potable water may have a TDS content of less than about 500 ppm. In some non-limiting embodiments, processed potable water may have a TDS content of less than about 250 ppm.

Examples of non-potable water, which may be treated in accordance with embodiments disclosed herein, may include seawater or salt water, brackish water, gray water, and some industrial water. An influent, or liquid to be treated, may include target species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and/or zinc. In accordance with one or more embodiments, a method includes treating seawater or brackish water where the liquid to be treated comprises a solute mixture. In some embodiments, monovalent ions in a liquid to be treated may be at a higher concentration as compared to the concentrations of divalent and other multivalent ions. References to seawater herein are generally applicable to other forms of non-potable water.

As used herein, "treated" relates to reducing the TDS content or reducing the concentration of suspended solids, colloidal content and ionized and non-ionized impurities in a source water to a level where the purified water has been rendered potable and may be used for fresh water purposes such as, but not limited to, human and animal consumption, irrigation, and industrial applications. Desalination is a type of purification in which salt is removed from water, for example, brackish water or seawater. One or more embodiments may pertain to desalination of seawater. The liquid to be treated may be from a variety of sources including those having a TDS content of between about 3,000 ppm and about 40,000 ppm, or more. The liquid to be treated may be, for example, seawater from the ocean, brackish water, gray water, industrial effluent, and oil fill recovery water. The liquid to be treated may contain high levels of monovalent salts, divalent and multivalent salts, and organic species. In some embodiments, notable aspects may involve methods of treating or desalinating a liquid to be treated comprising seawater. The liquid to be treated may be processed to a desired or required level of purity.

In accordance with one or more embodiments, an electrochemical treatment device may be modular. Each modular unit may generally function as a sub-block or sub-unit of an overall electrochemical separation system. A modular unit may include any desired number of cell pairs. In some embodiments, the number of cell pairs per modular unit may depend on the total number of cell pairs and passes in the separation device. A plurality of modular units may then be assembled together to provide an overall intended number of cell pairs in an electrochemical separation system. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

In addition, an electrochemical device may be modified so that there are multiple passes through a single device. Multi-pass flow configurations may be possible with the placement of blocking spacers or membranes within the electrochemical treatment device, between modular units, or within modular units. The portion of the electrochemical treatment device through which a flow pass is made may be referred to as a flow-pass sub-unit. The blocking membrane or spacer may be positioned between two flow-pass sub-units in a multi-pass flow configuration. In accordance with one or more embodiments, velocity may be increased in the same electrochemical module by reducing the number of cell pairs per flow-pass sub-unit in the electrochemical device. A device configured for multi-pass flow may also be referred to as a folded path device.

One or more modules may comprise a flow-pass sub-unit. One or more modules or flow-pass sub-units may comprise a stage of the electrochemical separation system. One or more electrochemical treatment devices may comprise a stage.

According to one or more embodiments, the system may comprise a polisher device at the end of the treatment process to remove a last fraction of dissolved solids from liquid undergoing treatment. The polisher device or module may be an electrodialysis or electrodeionization device. In such an embodiment, the number of electrochemical devices required may be reduced for a given product flow rate. The polishing step may also be used for increased removal of specific dissolved components such as boron, particularly in implementations where an injection of chemicals is performed.

The use of a polisher device has other potential benefits besides reduction in module capital cost. For example, according to an embodiment, boron removal may be carried out in the polishing stage, after most of the TDS is removed from the water undergoing treatment. If the pH of the dilute stream is increased to ~11 as the conductivity drops below 2 mS/cm (corresponding to about 1,150 ppm TDS), boron may be removed from an initial value of about 2.28 ppm in the seawater to about 0.95 ppm at a product conductivity of about 0.51 mS/cm (~250 ppm TDS). According to another embodiment, the polisher device may contain membranes with lower osmotic water loss in exchange for higher electrical resistance than alternative membranes. The benefits of the membranes with lower osmotic water loss may outweigh the energy costs associated with a higher electrical resistance.

In accordance with one or more embodiments, one or more sensors may be positioned to detect one or more characteristics, conditions, properties, or states of any stream, component, or subsystem generally associated with the system. In some embodiments, one or more of the sensors may be configured to detect a concentration of a target species in a stream entering or exiting the device. In one embodiment, one or more sensors may be positioned to detect a concentration at an inlet and/or an outlet of one or more compartments of the device and in various stages of the system. One or more sensors may be positioned to detect a pH level at an inlet or an outlet of one or more compartments of the device. A pressure sensor may be associated with one or more compartments of the device. Sensors for detecting TDS may be implemented. Sensors for detecting flow rate or flow velocity may be implemented.

One or more sensors may provide a representation of a property or characteristic of a stream into, from, or within the device, or a property or characteristic of a current applied through the device or across a cell stack. For example, the one or more sensors may be configured to measure and provide a representation, for example, a measured signal, of a process condition such as the pH of any stream exiting any of the compartments. The one or more sensors may also provide measured conductivity or resistivity values of any of the streams into, from, or within the system.

A controller may be employed for adjusting or regulating at least one operating parameter of the device or a component of the system, such as, but not limited to, actuating valves and pumps, as well as adjusting a property or characteristic of a current or an applied electric field through the electrochemical treatment device. The controller may be in electronic communication with at least one sensor configured to detect at least one operational parameter of the system. The controller may be generally configured to generate a control signal to adjust one or more operational parameters in response to a signal generated by a sensor. For example, the controller may be configured to receive a representation of a condition, property, or state of any stream, component, or subsystem of the device, or from the device. The controller may include an algorithm that facilitates generation of at least one output signal to control operation of the system which may be based on one or more targeted or desired values such as a set point.

Prior to treatment of feed water in the multi-stage electrochemical treatment system, a variety of pretreatment procedures may be employed. For example, pretreatment techniques may be utilized on a feed water that may contain solids or other materials that may interfere with or reduce the efficiency of any stage or device, such as by scaling or fouling. An optional initial treatment may be provided to remove at least a portion of suspended solids, colloidal substances and/or solutes of elevated molecular weight. Pretreatment processes may be performed upstream of an electrochemical treatment device and may include, for example, particulate filtration, sand filtration, carbon filtration, ultrafiltration, nanofiltration, microfiltration, such as cross-flow microfiltration, combinations thereof, and other separation methods directed to the reduction of particulates. Adjustments to the pH or alkalinity of feed water may also be performed by, for example, the addition of an acid, base, or buffer or through aeration. Electrochemical separation may follow any pretreatment operation to provide water having a desired final purity.

Ancillary components and/or subsystems may include pipes, pumps, tanks, power supply and distribution subsystems that cooperatively allow operation of the system.

In accordance with one or more embodiments, the electrochemical treatment system may be used for seawater desalination. The electrochemical treatment system may comprise a number of modular sub-blocks that may be piped in parallel or in series.

The flow path within each electrochemical treatment device may include multiple passes of the treated fluid through the flow-pass sub-units within The number of cell pairs per flow-pass sub-unit may vary within the system. For example, the number of cell pairs per pass may be reduced in the last few passes through a stage to increase the flow velocity in the dilute stream and thereby increase the limiting current density, according to Equation 1.

Figure 4:
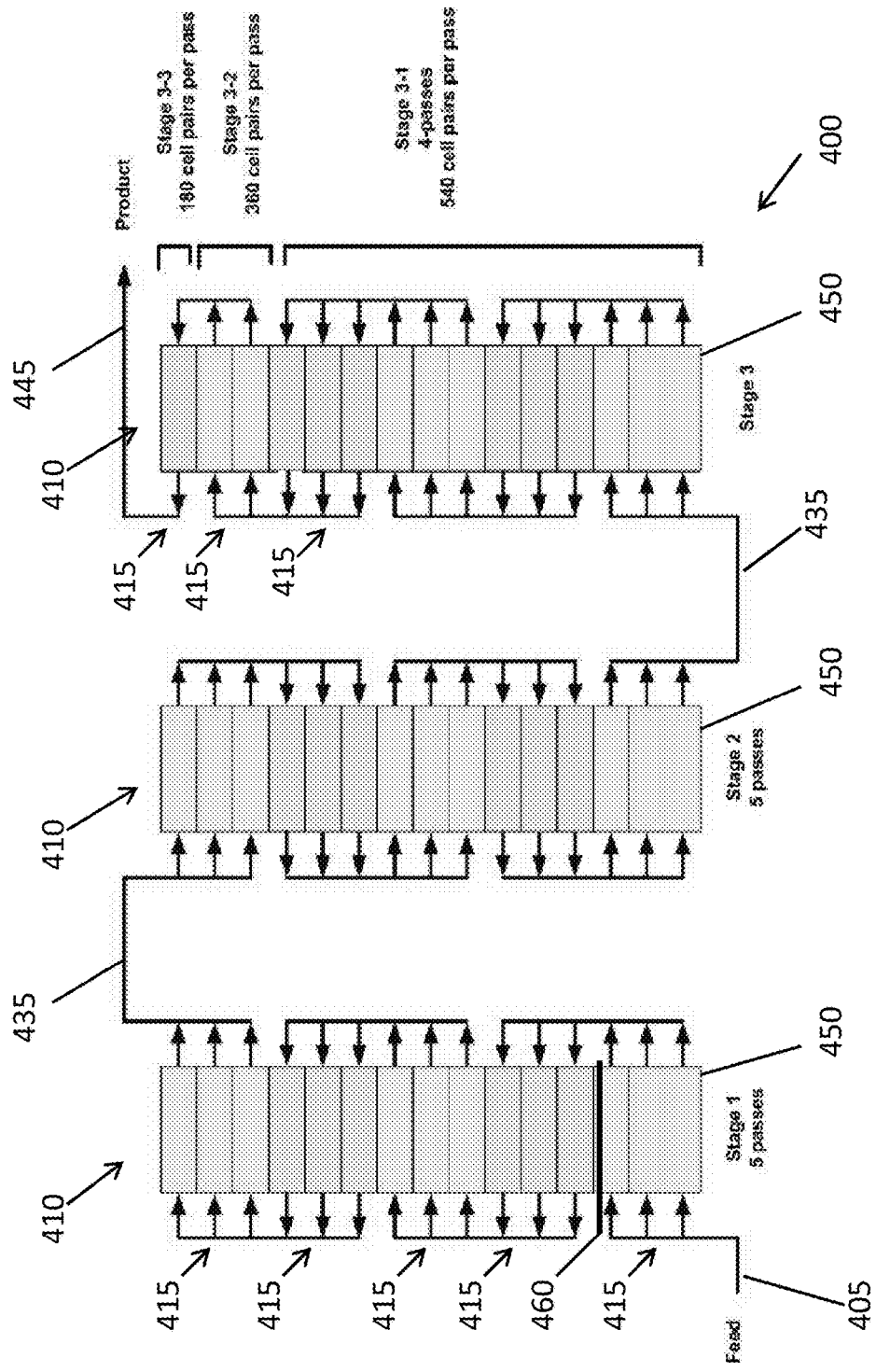
FIG. 4 presents a schematic of a multi-stage electrochemical treatment system in accordance with an embodiment.

FIG. 4 shows, for example, a multi-stage electrochemical system 400 with three stages (each stage 410 comprising an electrochemical treatment device 450, for example an electrodialysis device) in series and decreasing cell pairs per flow-pass sub-unit 415 in the last stage 410. In the embodiment disclosed in FIG. 4, there are five passes 415 in each of the first two stages 410, each pass containing 540 cell pairs in parallel. In the last stage, the number of cell pairs per flow-pass sub-unit 415 is reduced in the second to last pass to 360 cell pairs and finally 180 cell pairs for the final flow-pass sub-unit 415. A liquid to be treated 405 may be introduced to an inlet of a first stage 410 of the system 400. The multiple pass flow path of the liquid 405 may be facilitated by a blocking spacer 460 which directs flow back through the electrochemical treatment device 450. Other blocking spacers (not shown) may be positioned between other flow-pass sub-units 415 of a stage 410.

The electrochemical treatment device 450 may comprise one or more cell stacks made up of alternating anion and cation exchange membranes, with spaces between the membranes defining liquid flow compartments with inlets and outlets. A set of electrodes comprising a cathode and an anode may be positioned on either end of the one or more cell stacks to produce a current across the cell stack. The electrochemical treatment device 450 of the first stage 410 may be operated to treat liquid 405. A first amount of total dissolved solids may be removed from the liquid 405 to produce a partially-treated liquid 435. The partially-treated liquid 435 may be withdrawn from an outlet of the first stage 410.

The embodiment shown in FIG. 4 includes three stages. However, a system 400 may have two or more stages. In a final stage of the system 410, one or more electrochemical treatment devices 450 may be operated by applying a current across a cell stack to remove a second amount of total dissolved solids from the partially-treated liquid 435 to produce a treated liquid 445. The treated liquid 445 may be provided at an outlet of the final stage 410.

In further embodiments discussed below, such as the embodiment shown in FIG. 11, a plurality of stages 610 may form a train 660. The electrochemical system 600 may comprise a plurality of trains 660, in series, in parallel, or both. A large municipal or industrial electrochemical system may require a number of electrochemical trains in parallel, each train having a number of stages 610 in series. For a given product flow rate from the system, a non-uniform TDS removal may increase the total number of electrochemical devices 650 and therefore the associated capital cost.

In accordance with one or more embodiments, methods for controlling an electrochemical system are provided. Control methods proposed previously have involved straightforward feedback loops. For example, the conductivity of the product is measured with a sensor and transmitted to a process controller. The controller then varies the applied current using algorithms such as PID (proportional-integral-derivative) to minimize any deviation from the conductivity set point.

In accordance with one or more embodiments, the power consumption and the concentration polarization of the electrodesalination system comprising electrodialysis and electrodeionization modules may be reduced by applying different voltages to each stage of a multistage system. Water from the first stage may be transferred to the second stage and then to the third stage and beyond. A higher voltage and/or greater current density may be used in stages where the amount of ionic content in the water to be desalinated is greater and then decreased as the water becomes more pure such that later stages have a lower current density. In an electrodesalination system with a plurality of stages, electrodialysis modules may be used towards the seawater inlet and electrodeionization modules may be used later in the process after the water has been partially purified.

Figure 5:
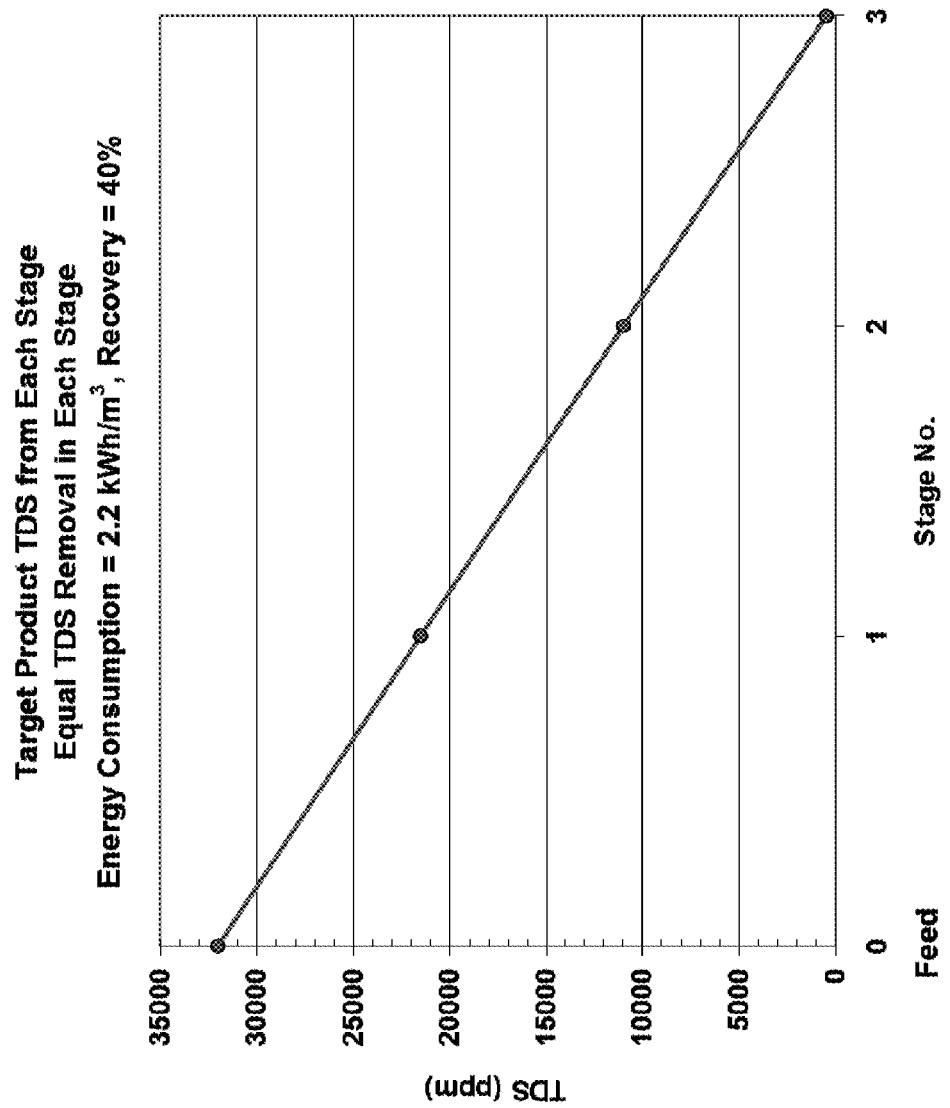
FIG. 5 presents a graph of total dissolved solids (TDS) removal per stage of a system in accordance with an embodiment.

In accordance with one or more embodiments, the amount of TDS removed per stage may be intentionally varied. For example, the system may be configured so that the TDS removal is frontloaded so that a smaller amount of TDS is removed at one or more later or downstream stages than at one or more earlier or upstream stages. Such a configuration may be advantageous for achieving a target TDS removal without exceeding the limiting current density, because under certain circumstances if TDS reduction is the same per stage, the applied current density may exceed the limiting current density at the outlet of a stage. For example, FIG. 5 presents a graph of TDS removal per stage where the removal rate is constant throughout a system like the one shown in FIG. 4. Table 1, below, indicates the limiting current density and applied current density for this system. The limiting current is calculated in this example using the equation:

$$i_{lim} = 0.02264 \, C \, u^{0.6933}$$

Where:
$i_{lim}$=limiting current density in units of A/m$^2$
C=bulk concentration in ppm
u=bulk velocity in cm/s In stages 3-2 and 3-3 the applied current density would exceed the limiting current density, thus causing polarization, an undesired condition.

TABLE 1

Data associated with FIG. 5.

| | | |
|---|---|---|
| Stage 3-1 | Dilute Velocity | 2.46 cm/s |
| | Limiting Current Density | 118.16 A/m$^2$ |
| | Applied Current Density | 102.94 A/m$^2$ |
| | Ratio of Limiting Current Density to Operating Current Density | 1.15 |
| Stage 3-2 | Dilute Velocity | 3.67 cm/s |
| | Limiting Current Density | 72.84 A/m$^2$ |
| | Applied Current Density | 102.94 A/m$^2$ |
| | Ratio of Limiting Current Density to Operating Current Density | 0.71 |
| Stage 3-3 | Dilute Velocity | 7.3 cm/s |
| | Limiting Current Density | 48.22 A/m$^2$ |
| | Applied Current Density | 102.94 A/m$^2$ |
| | Ratio of Limiting Current Density to Operating Current Density | 0.47 |

Figure 6:
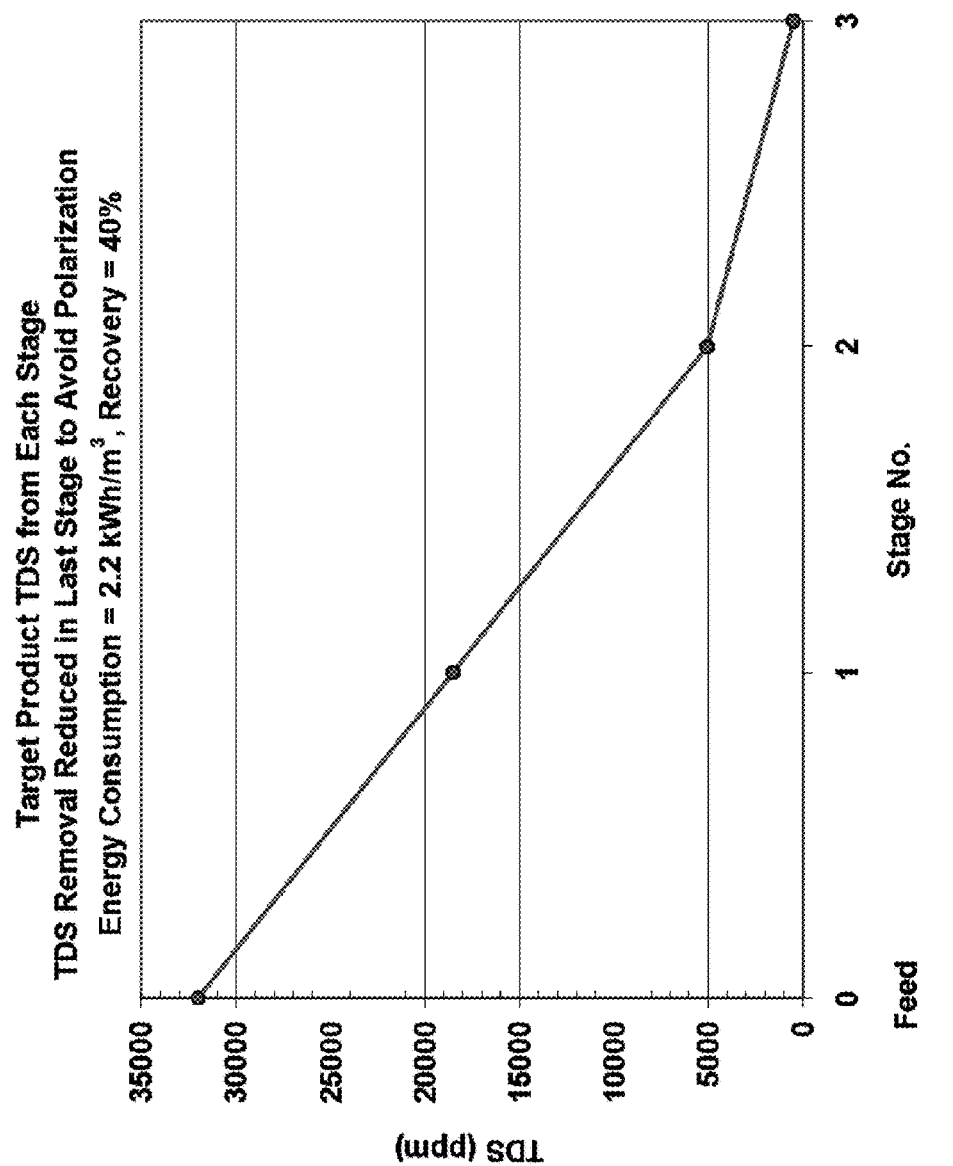
FIG. 6 presents a graph of TDS removal per stage of a system in accordance with an embodiment.

In one embodiment, one method of preventing polarization at the dilute effluent outlet is to reduce the TDS removal in the last stage, as shown in FIG. 6. FIG. 6 presents a graph of TDS removal per stage where the TDS removal rate is reduced at a final stage, in a system like that shown in FIG. 4. Table 2, below, indicates the limiting current density and applied current density for this system. In contrast to the embodiment in which TDS removal is uniform throughout all stages, Table 2 indicates that the applied current density in Stages 3-2 and 3-3 of the system would remain below the limiting current density and polarization would be avoided.

TABLE 2

Data Associated with FIG. 6

| | | |
|---|---|---|
| Stage 3-1 | Dilute Velocity | 2.17 cm/s |
| | Limiting Current Density | 57.31 A/m$^2$ |
| | Applied Current Density | 38.78 A/m$^2$ |
| | Ratio of Limiting Current Density to Operating Current Density | 1.48 |
| Stage 3-2 | Dilute Velocity | 3.23 cm/s |
| | Limiting Current Density | 43.11 A/m$^2$ |
| | Applied Current Density | 38.78 A/m$^2$ |
| | Ratio of Limiting Current Density to Operating Current Density | 1.11 |
| Stage 3-3 | Dilute Velocity | 6.44 cm/s |
| | Limiting Current Density | 42.48 A/m$^2$ |
| | Applied Current Density | 38.78 A/m$^2$ |
| | Ratio of Limiting Current Density to Operating Current Density | 1.10 |

Figure 7:
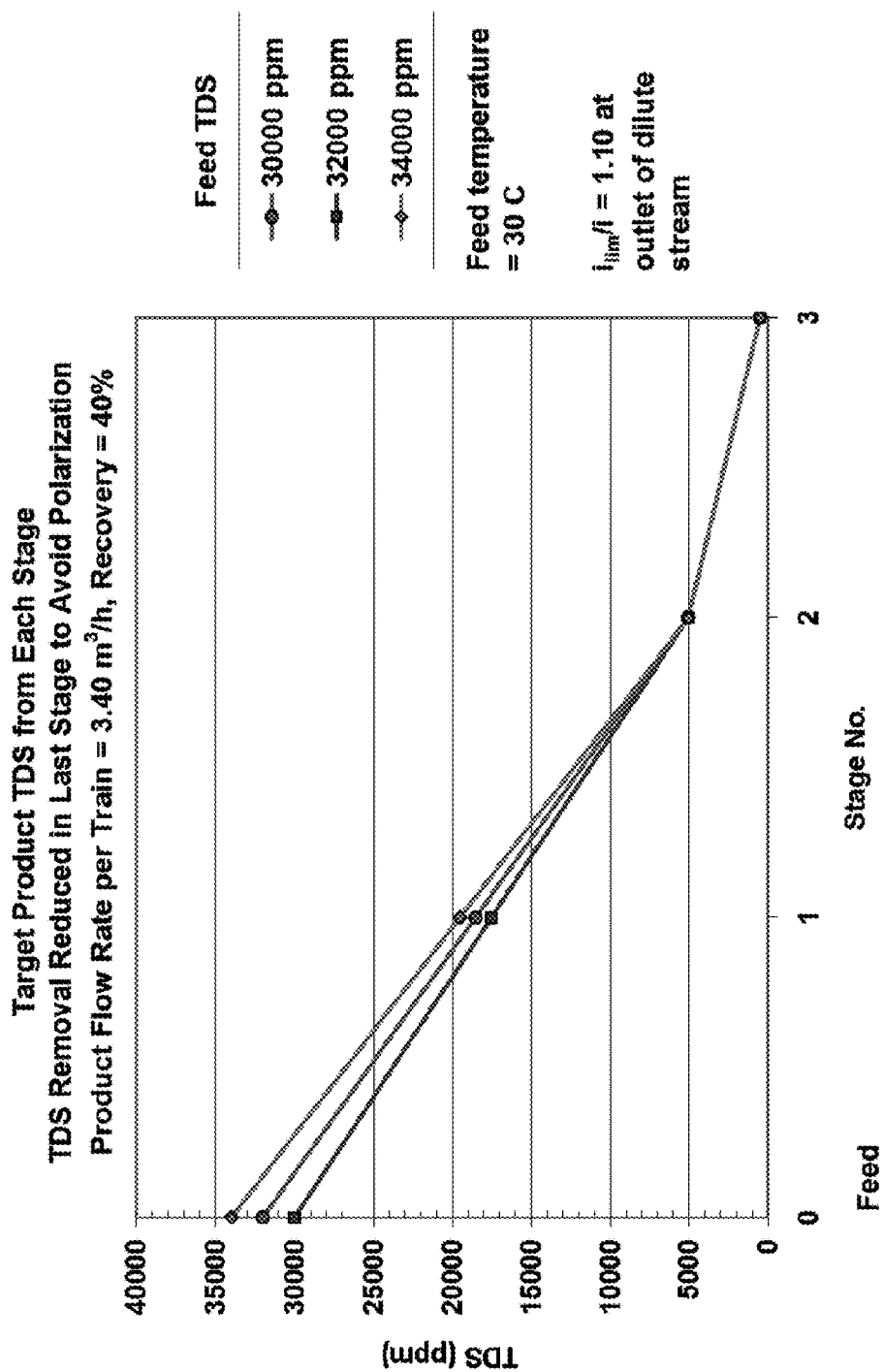
FIG. 7 presents a graph of TDS removal for various feed concentrations per stage of a system in accordance with an embodiment.

The TDS profile may be adjusted to prevent polarization as the TDS of the liquid to be treated, for example, seawater. FIG. 7 shows, for example, the TDS profiles of various liquids fed to an inlet of a system arranged like the system shown in FIG. 4. The product flow rate resulting from each of the feeds is maintained at 3.40 m³/h as the feed TDS varies from 30,000 ppm to 34,000 ppm. In a trade-off, however, the energy consumption increases as the feed TDS increases.

Figure 8:
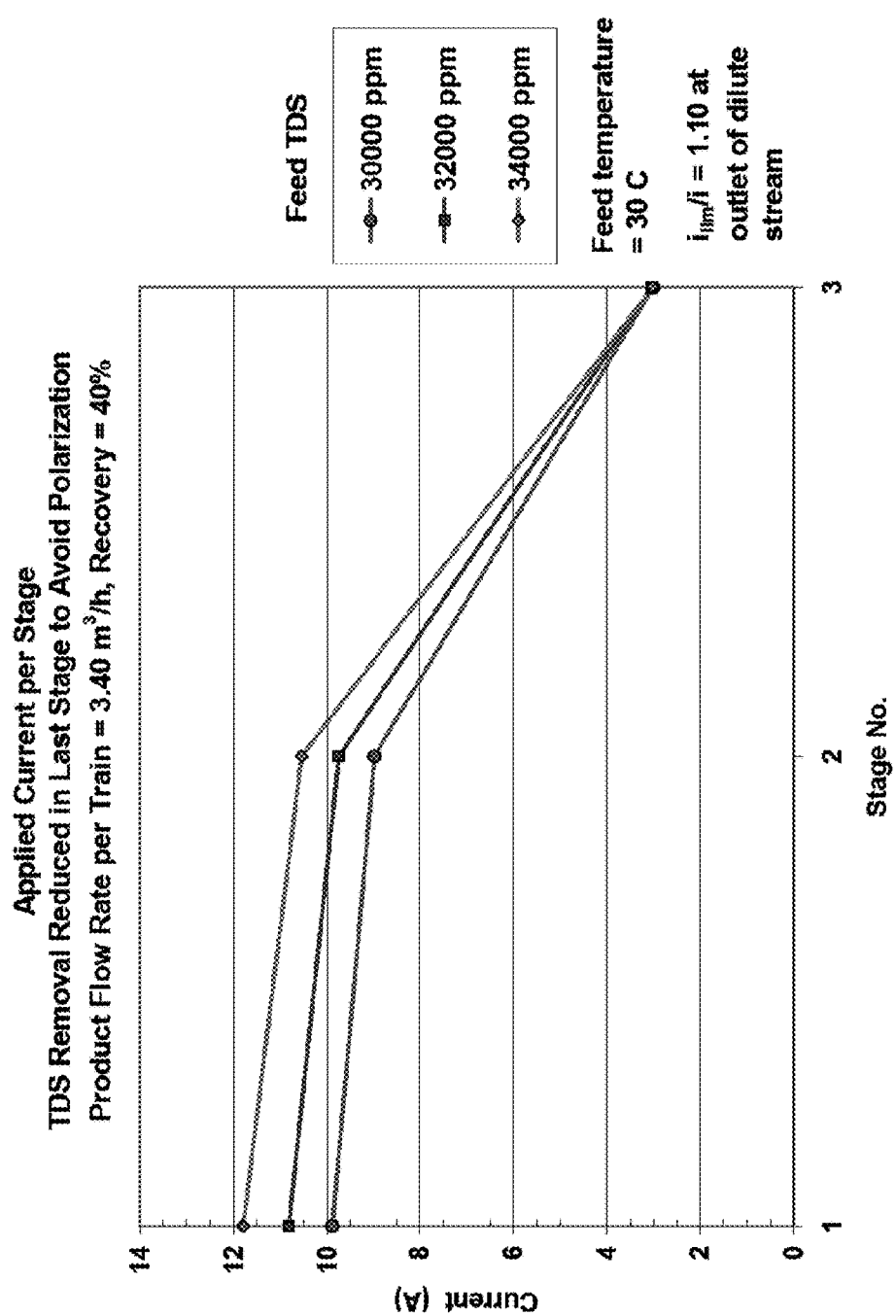
FIG. 8 presents a graph of current for various feed concentrations per stage of a system in accordance with an embodiment.
Figure 10:
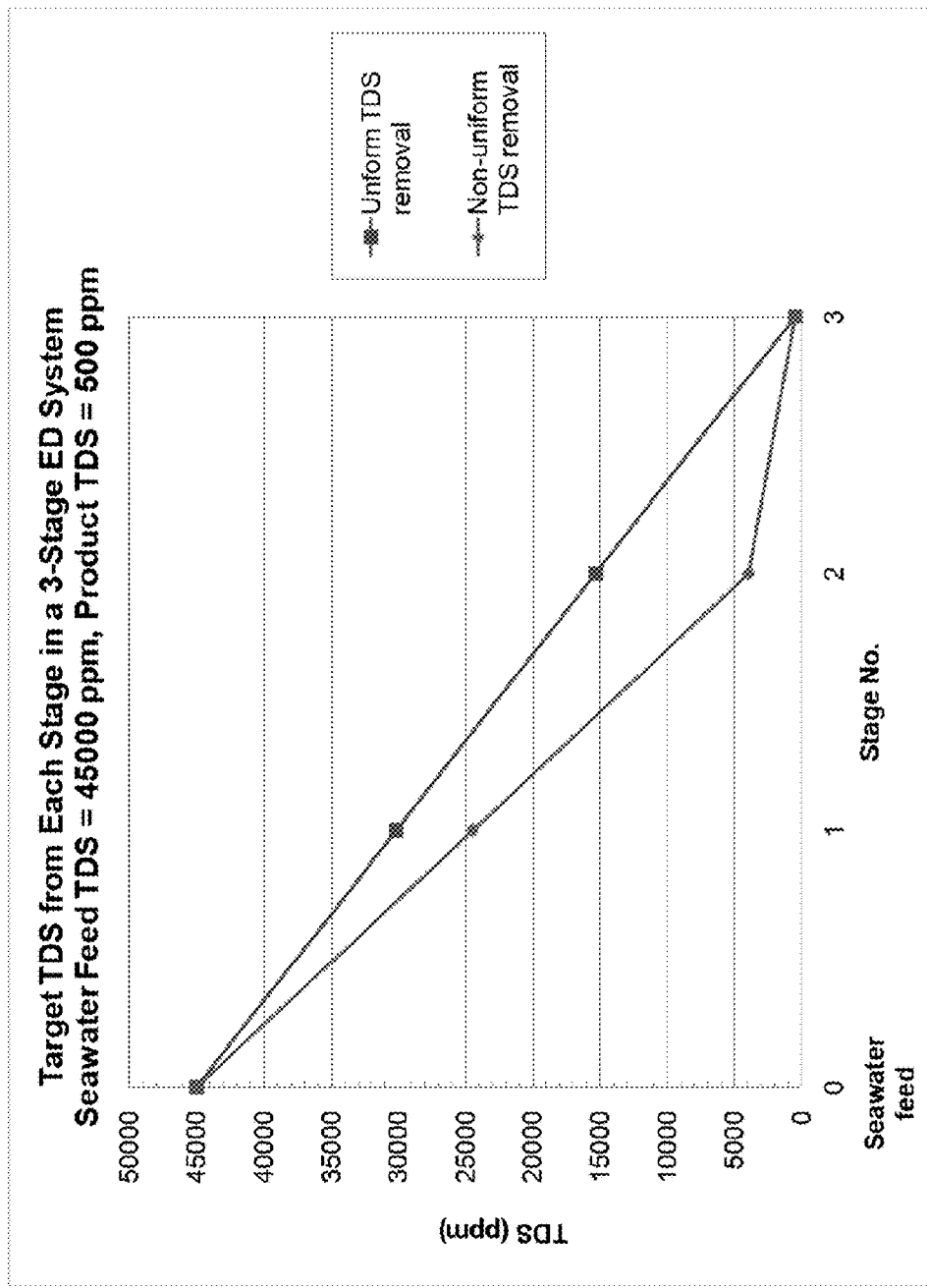
FIG. 10 presents a graph of TDS removal per stage of a system in accordance with an embodiment.

The target TDS per stage may be achieved by controlling the applied current, as shown in FIG. 8. Under certain operating conditions, increasing the flow velocity in the last pass may not be sufficient to avoid the limiting current density. Reducing the TDS removal in the last stage in addition to increasing the velocity may be one method of avoiding the limiting current density. For example, a current density at the end of Stage 3 of an exemplary system was calculated, assuming a seawater TDS of 45,000 ppm and temperature of 30° C. and two different profiles of target TDS per stage, as shown in FIG. 10. Table 3, below, shows that the current density in the third stage exceeds the limiting current density when the TDS removal is the same per stage, but that the current density is below the limiting current density when the third stage only has to reduce the TDS from 3,930 ppm to 500 ppm.

TABLE 3

Data Associated with FIG. 10.

| Energy Consumption = 3.5 kWh/m³ Overall Water Recovery = 40% | Uniform TDS Removal per Stage | Non-Uniform TDS Removal per Stage |
|---|---|---|
| Product Flow Rate per Train: | 4.40 m³/h | 3.30 m³/h |
| Limiting Current Density of the Third Stage: | 33.16 A/m² | 23.50 A/m² |
| Applied Current Density of the Third Stage: | 126.25 A/m² | 21.35 A/m² |

In accordance with one or more embodiments, a predictive mode of control may be provided. A predictive mode of control may anticipate downstream conditions in response to parameters measured at, for example, a feed inlet. With multiple passes, the total residence time in the three stages of a system, like the one shown in FIG. 4, is about 200 seconds. Any changes in the feed water TDS and temperature, for example, would not affect the product TDS and limiting current density at the dilute effluent outlet until several minutes later. In a system that lacks a predictive mode of control, but which instead employs feedback control based on sensors in the last stage, polarization could occur before the applied currents could be adjusted and the system could respond accordingly. As discussed earlier, once polarization occurs, the system may become unstable quickly and become unresponsive to further adjustments in current.

In accordance with one or more embodiments using a predictive mode of control, the initial process controller response be based on feed water conductivity, temperature measurements and flow rate. The current to be applied per stage may be calculated using a process model and the operating parameters adjusted of the electrochemical system. The controller may be configured to "overshoot" initially to ensure that polarization does not occur at the dilute effluent outlet. After a time delay to allow the system to respond, the control outputs may be more finely tuned based on measurements of dilute effluent outlet conductivity and flow velocity.

The predictive mode of control may also be configured to account for patterns in parameter values observed over time. For example, patterns of variations in feed water TDS and temperature, month to month, day to day, and even during a day may be used to adjust the operating parameters of the electrochemical system. The patterns may be predicted based on historical data, meteorological data, etc. In another embodiment, patterns of variations in product water demand, seasonal, daily, or hourly may be used to adjust operating parameters of the electrochemical system. The flow rates may be adjusted accordingly. The applied current may be controlled to prevent polarization. In another embodiment, patterns of variations in cost of electricity may be used to adjust operating parameters of the electrochemical system. Flow rates and currents may be adjusted to minimize operating cost while ensuring that polarization will not occur.

EXAMPLES

Example 1

A water treatment system was designed to desalt seawater for reinjection into an oil reservoir to increase oil recovery. The required product flow rate was 16,000 m³/day with a final TDS of 900 ppm. The overall water recovery was to be maintained at 50%. The average seawater TDS is 36,520 ppm at a temperature of 20° C., with a composition shown in Table 4.

TABLE 4

Concentration of Major Ions in Example 1.

| Ion | Mg/l |
|---|---|
| Na | 11,150 |
| K | 420 |
| Ca | 428 |
| Mg | 1,410 |
| Cl | 20,310 |
| SO4 | 2,800 |

Two alternative configurations for electrochemical and CEDI trains and stages were compared. The first configuration is shown in FIG. 11 and does not include a polisher device downstream of the trains each of which comprises three stages. The second configuration is shown in FIG. 12 and includes a polisher device downstream of the trains, each of which comprises only two stages. As will be discussed below, the second configuration with the polisher device allows for a more energy-efficient removal of TDS from a liquid feed stream.

Using a computer-based process model, the energy consumption per unit product (kWh/m³) was calculated for different product flow rate per train. Table 5 gives the key membrane properties used in the model and Table 6 the specifications for the electrochemical treatment devices.

TABLE 5

Key Membrane Properties Used in Process Model.

| | |
|---|---|
| Average membrane area resistance in 0.5 NaCl at 20° C. (ohm cm²) | 1.30 |
| Electro-osmotic water loss coefficient (moles of H2O per mole of NaCl transferred through the membranes) | 9.20 |
| Osmotic water loss coefficient (mL m⁻² h⁻¹ bar⁻¹) | 4.50 |

TABLE 6

Key Specifications of the Electrochemical Treatment Devices.

| Design | Cross-flow configuration |
|---|---|
| Thickness of flow compartments (mm) | 0.25 |
| Active area per membrane (m$^2$) | 0.0783 |
| Total number of cell pairs per device | 3,600 |

In all cases the TDS removal per stage was adjusted so that the operating current density was less than 90.9% of the limiting current density at the outlet of each stage. The total number of trains and electrochemical treatment devices for the system was then calculated.

$N$=number of trains=$Q_p/q_p$, rounded up to the nearest integer n=electrochemical treatment devices=SN Where:
$Q_p$=total product flow rate for the system
$q_p$=product flow rate per train
S=number of electrochemical treatment devices in series in each train. For example, in FIG. 11, S=3.

Figure 11:
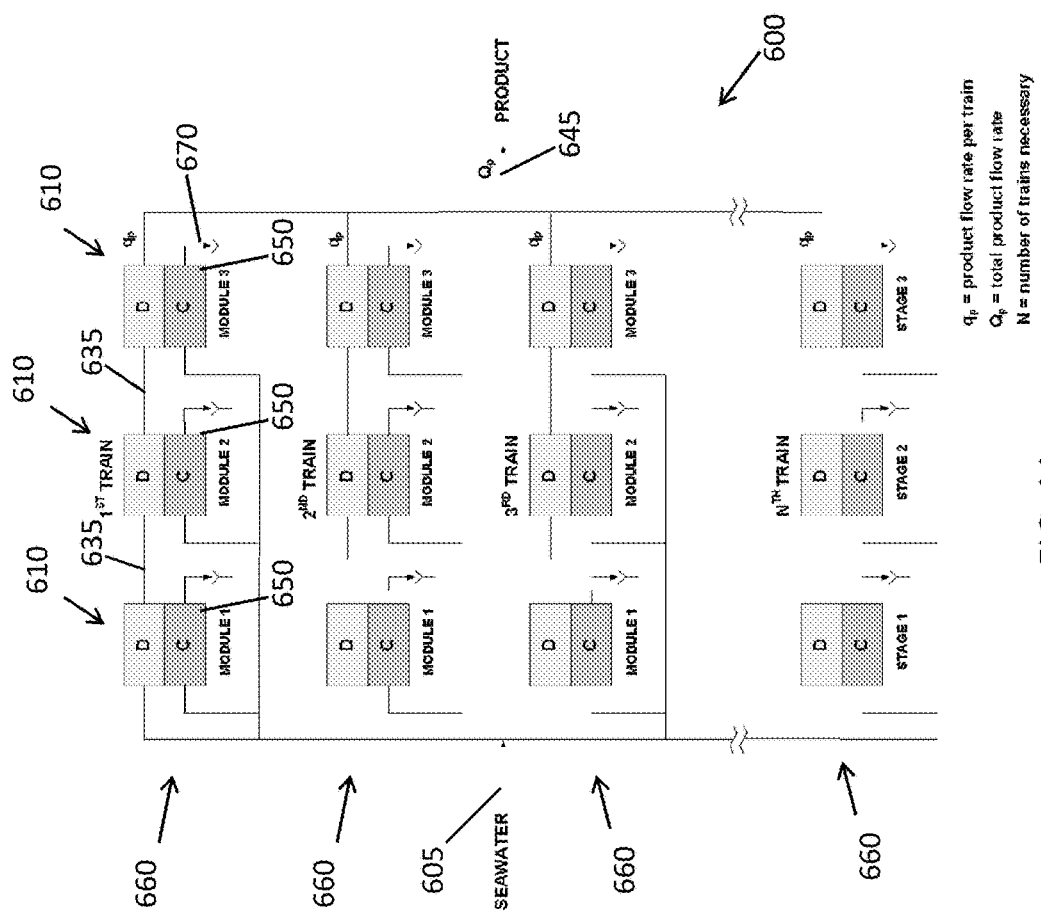
FIG. 11 presents a schematic of a multi-stage electrochemical system with multiple trains in parallel in accordance with an embodiment.
Figure 12:
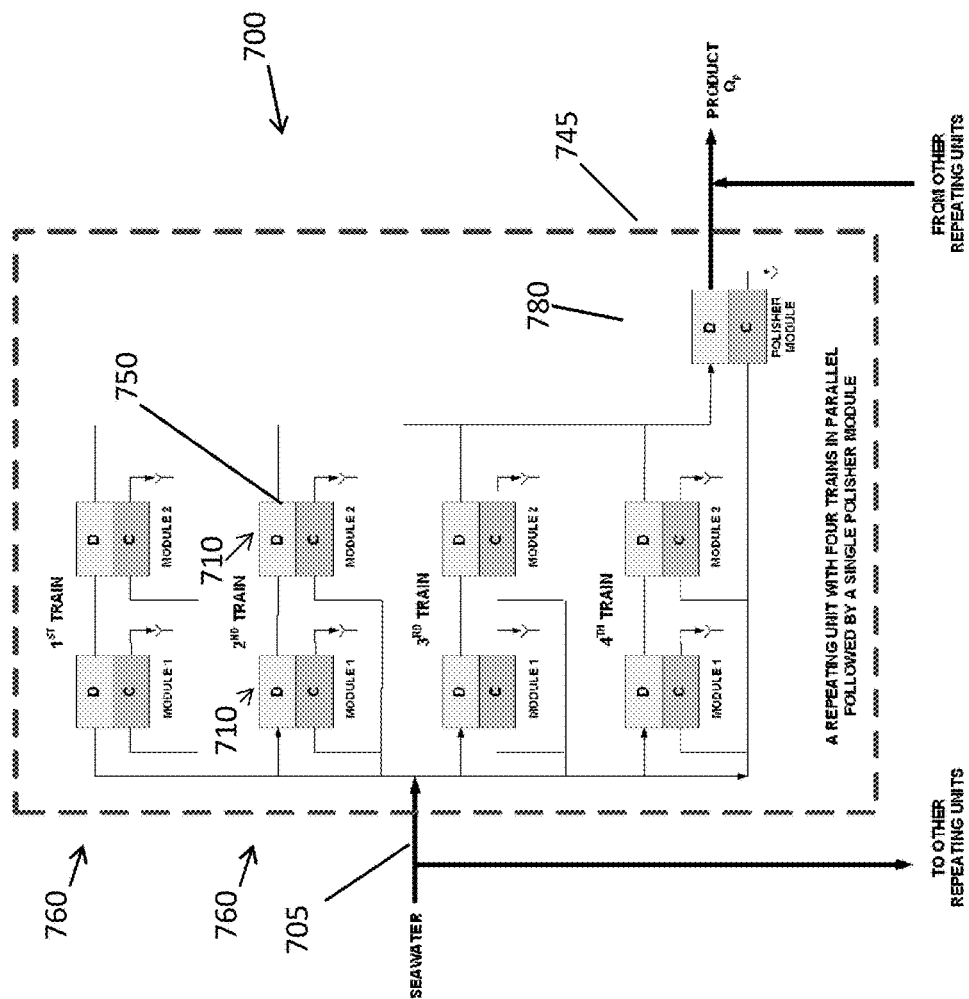
FIG. 12 presents a schematic of a multi-stage electrochemical system with multiple trains in parallel in accordance with an embodiment.

FIG. 11 represents a schematic of the first of the compared configurations. FIG. 11 shows a system with multiple 3-stage trains 660 in parallel. Each train 660 receives liquid 605 to be treated. As the liquid 605 passes through each stage 610 of a respective train 660 total dissolved solids are removed to provide a partially-treated liquid 635. Once the partially treated liquid 635 has passed through all the stages 610 of a train to produce a treated liquid 645, the treated liquid 645 may be collected from the various trains 660 and delivered to, for example, a point of use. Meanwhile flow from the concentrate stream 670 may be directed to, for example, a drain. The liquid 605 to be treated may be seawater. The treated liquid 645 may be potable water.

Figure 9:
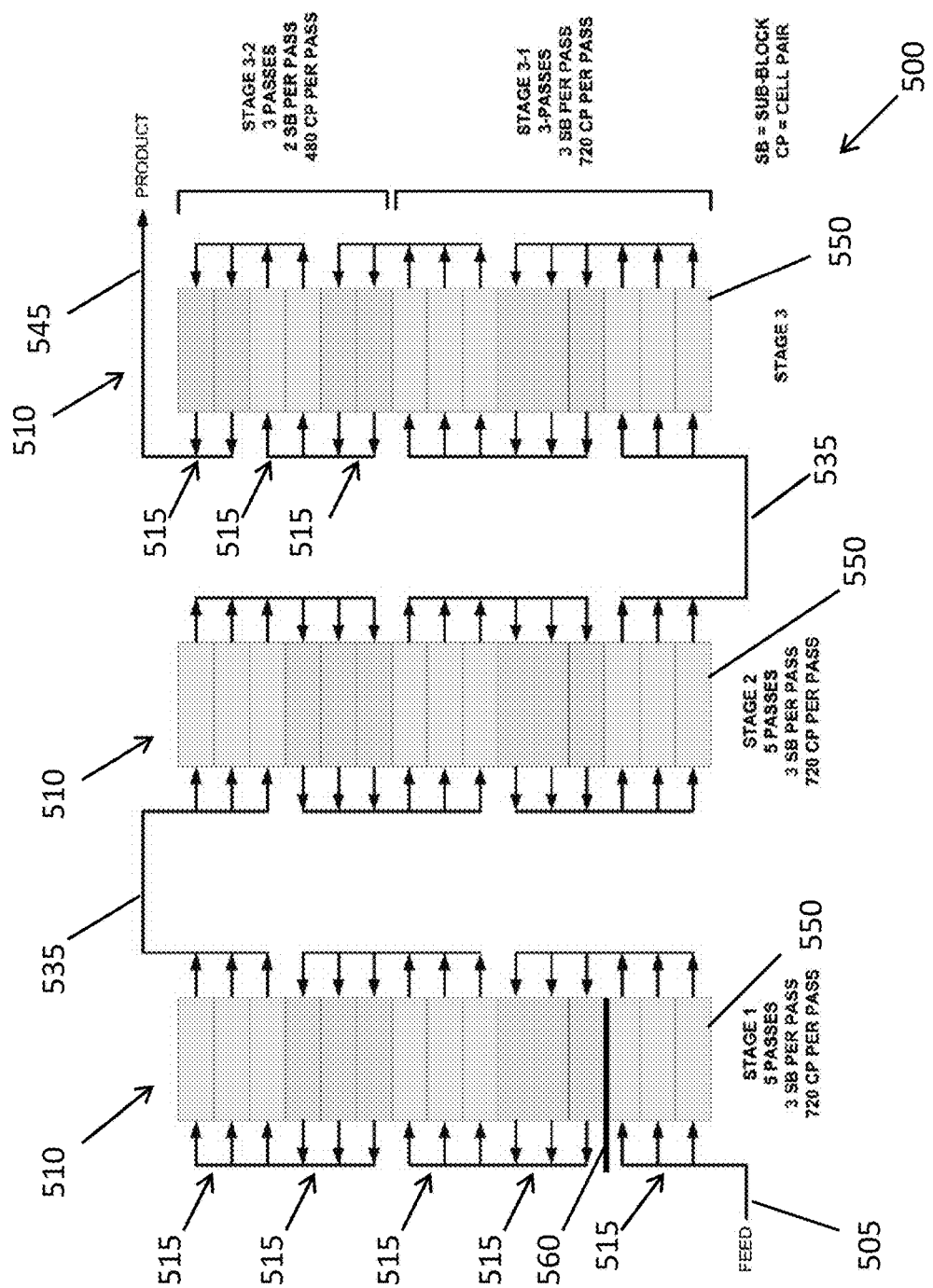
FIG. 9 presents a schematic of a multi-stage electrochemical system with varying cell pairs per stage or sub-stage in accordance with an embodiment.

The dilute flow path in each train was as shown in FIG. 9. The multi-stage electrochemical treatment system 500 shown in FIG. 9 comprises three stages 510. The first stage 510 comprises five flow-pass sub-units 515 separated by blocking spacers 560. Each flow-pass sub-unit 515 of the electrochemical treatment devices 550 of the first and second stages 510 comprises 720 cell pairs. Each of the first three sub-units 515 of the third stage 510 comprises 720 cell pairs. Each of the final three sub-units 515 of the final stage 510 comprises 480 cell pairs.

FIG. 12 represents a schematic of the second of the compared configurations of Example 1. FIG. 12 shows another possible configuration for electrochemical devices. In this configuration the electrochemical system 700 consists of multiple sub-systems (repeating units) in parallel. In each repeating unit, liquid 705 to be treated enters the trains 760 and products from four trains 760, each consisting of two stages 710 in series, are combined as feed to a polisher device 780 to produce a treated liquid 745. Using the process model, the number of repeating units for the system was calculated for different overall energy consumption. The TDS removal per stage 710, including the polishing stage 780, is again adjusted to avoid the limiting current density. The number of electrochemical treatment devices 750, n, was calculated as follows:

$n=U(ST+T/R)$

Where:
U=Total number of repeating units
S=Number of electrochemical treatment devices 750 in series in each train 760 (S=2 in the example in FIG. 12)
T=Number of trains 760 in each repeating unit (T=4 in the example in FIG. 7)
R=number of trains 760 feeding the polisher device 780 (R=4 in the example in FIG. 12)

Figure 13:
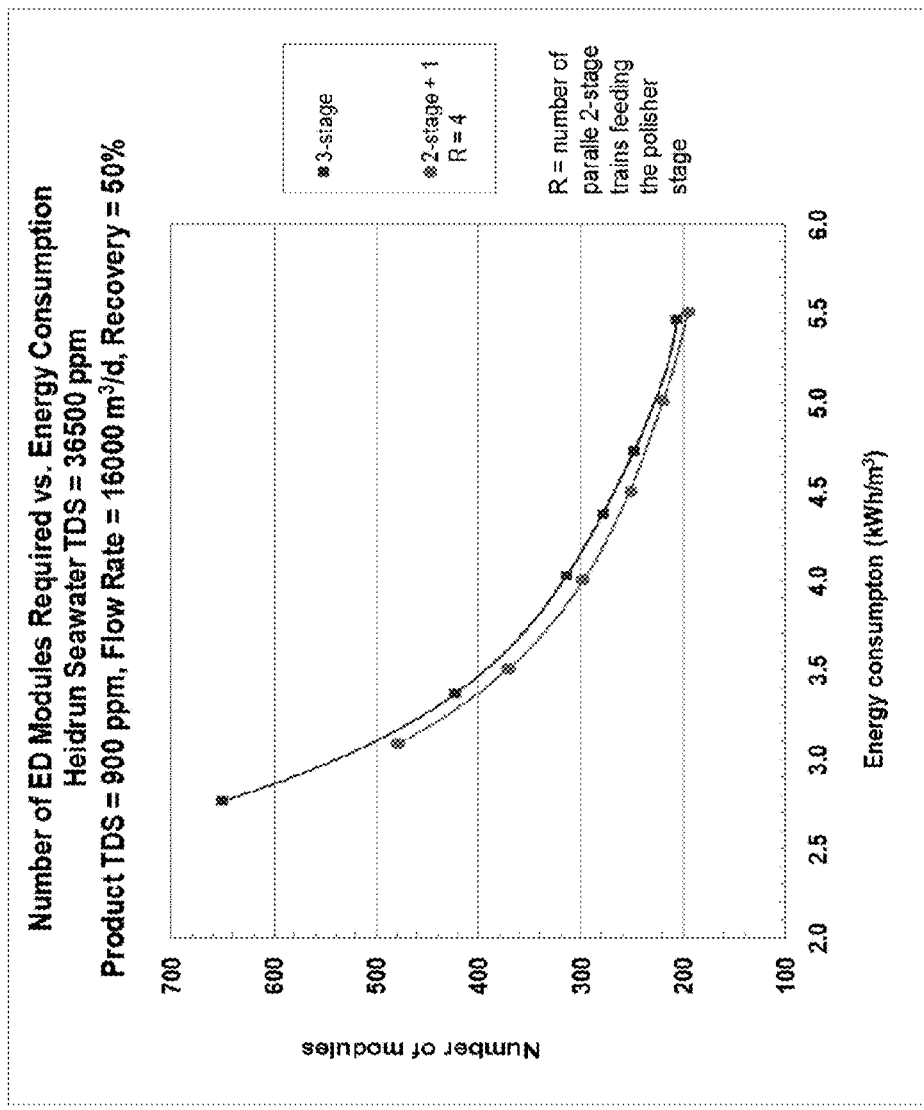
FIG. 13 presents a graph comparing number of energy modules to energy consumption for two systems in accordance with an embodiment.

FIG. 13 shows the total number of electrochemical modules necessary vs. energy consumption for the different module configurations. For a given energy consumption, the total number of electrochemical modules necessary is actually lower with a polisher stage present because the product flow rate per train may be increased. The two-stage plus polisher designs, like the one shown in FIG. 12, result in an approximately 5% decrease in the total number of modules necessary, with corresponding decrease in associated capital equipment such as support skids, piping, valves, instrumentation and power supplies.

Example 2

A water treatment system was designed to desalt seawater to potable water for use in a municipality. The required product flow rate was 140,000 m$^3$/d with a final TDS of 500 ppm and an overall water recovery of 40%. The seawater TDS is 45,000 ppm at a temperature of 30° C.

Figure 14:
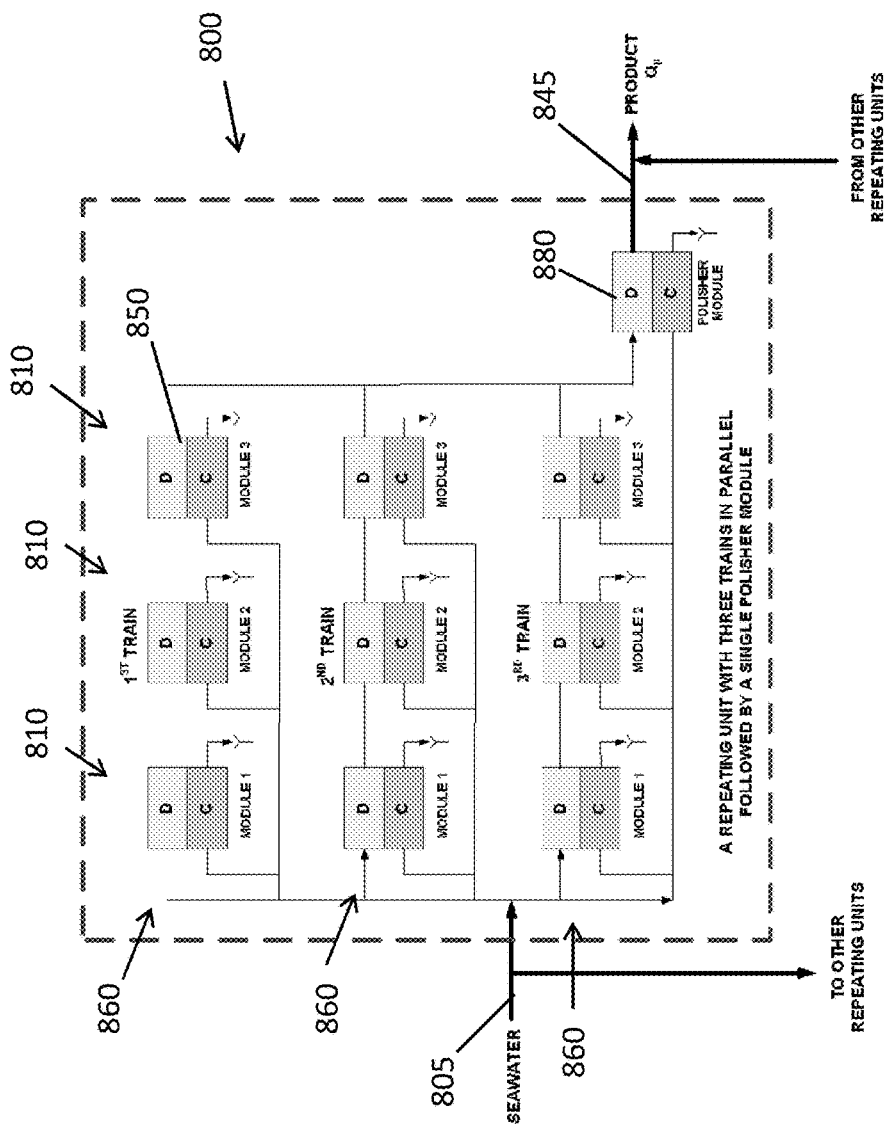
FIG. 14 presents a schematic of a multi-stage electrochemical system with multiple trains in parallel in accordance with an embodiment.

The first configuration tested was the configuration depicted in FIG. 11, with multiple three-module trains in parallel, already described above. The flow configuration in each train was as shown in FIG. 9. The second configuration tested was the configuration depicted in FIG. 14. FIG. 14 shows a repeating unit 800 with multiple trains 860 in parallel followed by a polisher device 880. Again, as in Example 1, the system implementing a polishing device 880 downstream of the train 860 was able to achieve a more energy-efficient water treatment, as shown in FIG. 16.

In each unit of the system 800 shown in FIG. 14, a liquid to be treated 805 is introduced to the trains 860 and products from three trains 860, each consisting of three stages 810 in series, were combined as feed to a polisher module 880, which produced the final treated liquid 845. The addition of the polishing stage 880 allowed the product flow rate per train to increase while maintaining a given overall energy consumption. The TDS removal per stage 810 was adjusted so that the operating current density was less than 90.9% of the limiting current density at the outlet of each stage.

Figure 15:
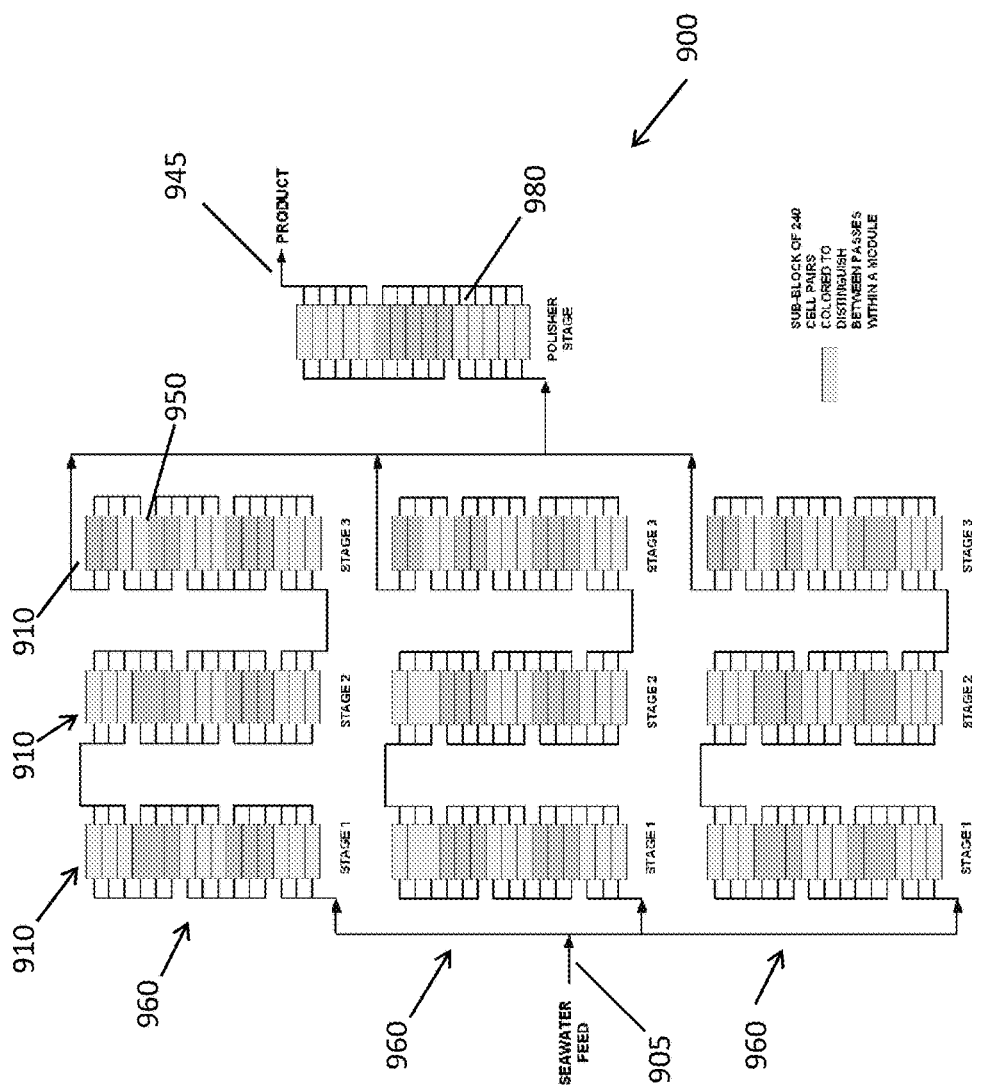
FIG. 15 presents a schematic of a multi-stage electrochemical system with multiple trains in parallel in accordance with an embodiment.

The embodiment shown in FIG. 15 is similar to that of FIG. 14 and shows the dilute flow path through a repeating unit. In the embodiment shown in FIG. 15, a liquid to be treated 905 is introduced to the first stage 910 of each train 960. Each flow-pass sub-unit in the first stage 910 of a train 960 comprises 720 cell pairs. In the third stage 910 of each train 960, the final three flow-pass sub-units of the electrochemical treatment device 950 each comprise 480 cell pairs. The polisher device 980 comprises three flow-pass sub-units each comprising 1,200 cell pairs. The number of parallel trains 960 of system 900 was selected so that the velocity at the inlet to the polisher stage 980 was equal to or greater than the velocity at the exit of the last device 950 in each train 960. The polisher device 980 produces a treated liquid 945.

Figure 16:
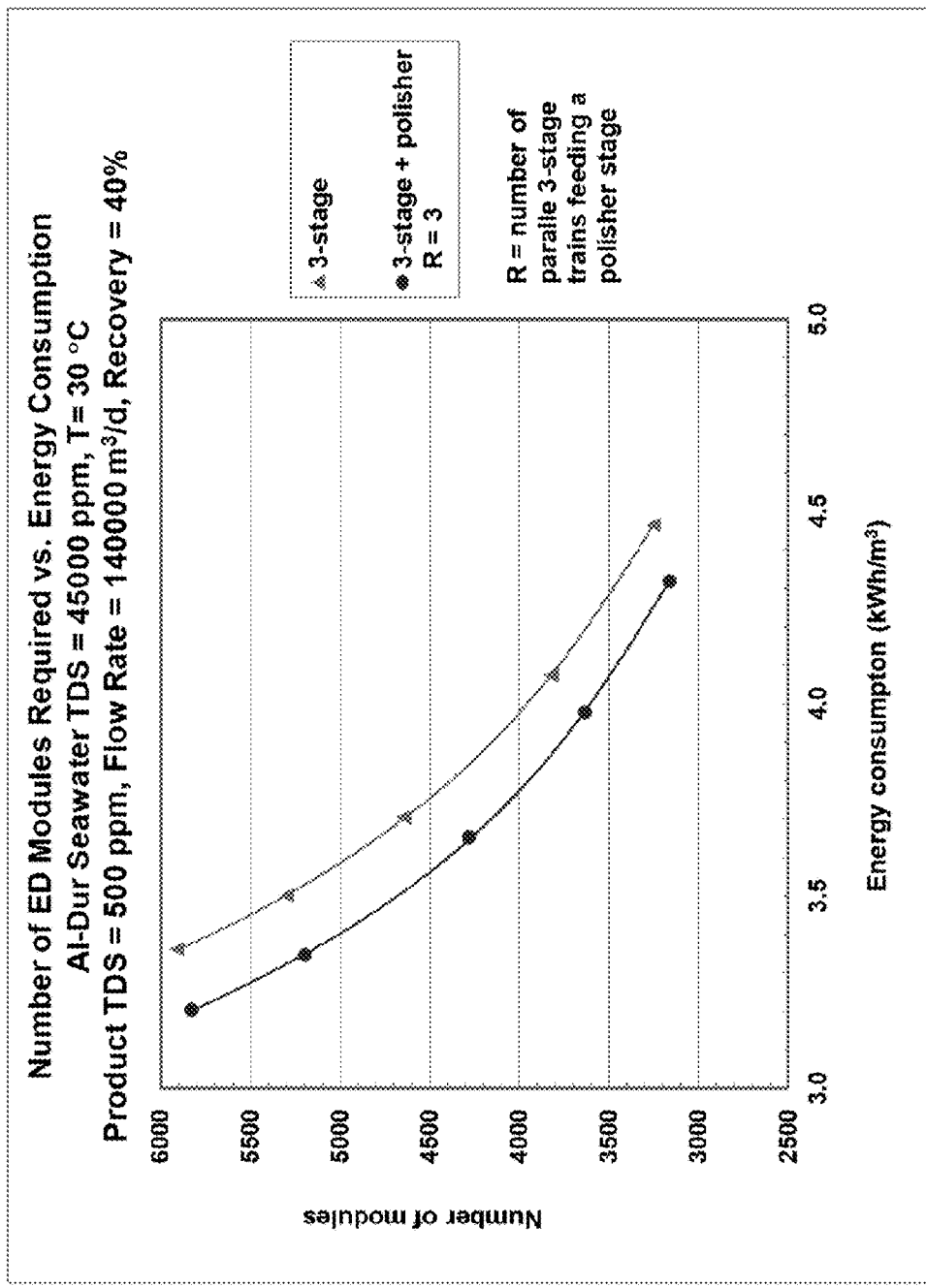
FIG. 16 presents a graph comparing number of energy modules to energy consumption for two systems in accordance with an embodiment.

FIG. 16 shows the total number of electrochemical modules necessary vs. energy consumption for the different module configurations used in this example. The process model is the same as in EXAMPLE 1. The total number of modules necessary was about 8-11% lower for the three-stage plus polisher design depicted in FIG. 14 vs. the three-stage design depicted in FIG. 11, demonstrating again the utility of a polisher device downstream of the train.

Those skilled in the art would readily appreciate that the various configurations described herein are meant to be exemplary and that actual configurations will depend upon the specific application for which the water treatment system and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a water treatment system. It is, therefore, to be understood that the foregoing embodiments are presented by way of example only and that, within the scope of the appended claims and equivalents thereto, the disclosed system and methods may be practiced otherwise than as specifically described. The present system and methods are directed to each individual feature or method described herein. In addition, any combination of two or more such features, system or methods, if such features, system or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the system and methods may involve connecting or configuring an existing facility to a treatment system. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to."Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of the term "fluid communication" should be understood to include devices that are configured in a parallel or a series arrangement. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed many modifications, additions, and deletions may be made therein without departing from the spirit and scope of the disclosure and its equivalents, as set forth in the following claims.

What is claimed is:

1. A method of operating a multi-stage electrochemical treatment system having a first stage with at least one electrochemical treatment device comprising a first cell stack, and a second stage with at least one electrochemical treatment device comprising a second cell stack, the first stage in fluid communication upstream of the second stage, the method comprising:

introducing a liquid to be treated to an inlet of the first stage;

measuring a conductivity, total dissolved solids concentration, temperature, and a flow rate of the liquid to be treated at the inlet to the first stage;

calculating a limiting current density for the first stage based in part on the total dissolved solids concentration of the liquid to be treated and the flow rate of the liquid to be treated and based on the measured conductivity of the liquid to be treated at the inlet to the first stage and the temperature of the liquid to be treated at the inlet to the first stage;

operating in the first stage at a first liquid flow velocity through the first stage and at a first current density across the first cell stack, the first current density below the limiting current density for the first stage;

removing a first amount of total dissolved solids from the liquid, in the first stage, to produce a partially-treated liquid;

withdrawing the partially-treated liquid from an outlet of the first stage;

introducing the partially-treated liquid to an inlet of the second stage;

calculating a limiting current density for the second stage based in part on a measured total dissolved solids concentration of the partially-treated liquid and a measured flow rate of the partially-treated liquid and based on the measured conductivity of the liquid to be treated at the inlet to the first stage, the temperature of the liquid to be treated at the inlet to the first stage, and the measured flow rate of the liquid to be treated at the inlet to the first stage;

operating in the second stage at a second liquid flow velocity through the second stage and at a second current density across the second cell stack, the second liquid flow velocity greater than the first liquid flow velocity and the second current density below the limiting current density for the second stage;

removing a second amount of total dissolved solids from the partially-treated liquid, in the second stage, the second amount of total dissolved solids being less than the first amount of total dissolved solids to produce a treated liquid;

withdrawing the treated liquid from an outlet of the second stage; and passing the treated liquid through a polishing device to produce a polished treated liquid, the polishing device configured to remove a third amount of total dissolved solids from the treated liquid that is less than the second amount of total dissolved solids.

2. The method of claim 1, wherein a total dissolved solids concentration of the liquid to be treated at the inlet of the first stage is greater than about 30,000 ppm.

3. The method of claim 2, wherein a total dissolved solids concentration of the polished treated liquid is less than about 500 ppm.

4. The method of claim 1, wherein a ratio of the limiting current density for the first stage to the first current density and a ratio of the limiting current density for the second stage to the second current density is at least 1.10.

5. The method of claim 1, wherein the treated liquid is introduced to the polishing device at a liquid flow velocity that is equal to or greater than the second liquid flow velocity.

6. The method of claim 1, further comprising removing boron from the treated liquid with the polishing device.

7. The method of claim 6, further comprising adjusting a pH of the treated liquid to be passed through the polishing device to a pH of about 11.

* * * * *